United States Patent
Huang et al.

(10) Patent No.: US 8,275,191 B2
(45) Date of Patent: Sep. 25, 2012

(54) IMAGE PROCESSING APPARATUS AND METHOD FOR GENERATING COORDINATION CALIBRATION POINTS

(75) Inventors: Yi-Ming Huang, Banchiao (TW); Ching-Chun Chiang, Tao Yuan Shien (TW); Yun-Cheng Liu, Bianciao (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1005 days.

(21) Appl. No.: 12/289,319

(22) Filed: Oct. 24, 2008

(65) Prior Publication Data
US 2009/0274373 A1 Nov. 5, 2009

(30) Foreign Application Priority Data
Apr. 30, 2008 (TW) .............................. 97115819 A (51) Int. Cl.
*G06K 9/00* (2006.01)
(52) U.S. Cl. .................... 382/151; 382/152; 382/154
(58) Field of Classification Search .................... None
See application file for complete search history.

(56) References Cited

U.S. PATENT DOCUMENTS
| 6,101,288 | A | 8/2000 | Kang |
| 2005/0083402 | A1 | 4/2005 | Klose |
| 2007/0160960 | A1* | 7/2007 | Manard et al. ................... 434/11 |

FOREIGN PATENT DOCUMENTS
TW 519572 2/2003

OTHER PUBLICATIONS
English language translation of abstract of TW519572 (Published Feb. 1, 2003).

* cited by examiner

*Primary Examiner* — Brian P Werner
(74) *Attorney, Agent, or Firm* — Thomas, Kayden, Horstemeyer & Risley, LLP (57) ABSTRACT

The invention provides an image processing apparatus for generating coordination calibration points. The image processing apparatus includes a subtracting module, an edge detection module and an intersection point generation module. The subtracting module subtracts a first image from a second image to generate a first subtracted image, and subtracts the first image from a third image to generate a second subtracted image. The edge detection module performs an edge detection process for the first subtracted image to generate a first edge image, and performs the edge detection process for the second subtracted image to generate a second edge image, wherein the first edge image includes a first edge and the second edge image includes a second edge. The intersection point generation module generates, according to the first and second edges, an intersection point pixel, serving as the coordination calibration point corresponding to the first edge and the second edge.

9 Claims, 9 Drawing Sheets

IMAGE PROCESSING APPARATUS AND METHOD FOR GENERATING COORDINATION CALIBRATION POINTS

BACKGROUND OF THE INVENTION

1. Field of the Invention

This invention relates to an image processing apparatus, and more particularly, to an image processing apparatus for generating coordination calibration points.

2. Description of the Prior Art

Recently, various kinds of input techniques, desirable to provide convenience to users, such as touch panels, voice inputting, and gesture inputting, have attracted market attention gradually, and then have been developing rapidly. In many applications related to input devices, image processing usually serves as an important link.

For example, the function of gesture inputting can be achieved by utilizing an image capture device to capture the image corresponding to a user's gesture, and then by utilizing image processing techniques and gesture recognition techniques. On the other hand, if the user projects a light on a screen to form a light-spot, the goal of inputting can also be achieved by determining the location of the light-spot on the screen by the use of the image processing techniques after the image capture device captures the image corresponding to the screen. In a practical application, the foregoing image capture device can capture images with a wide-angle lens or a fish-eye lens, so as to cover the entire screen in a short distance.

However, distortion phenomenon always occurred on the images captured by the image capture device with a wide-angle lens or a fish-eye lens. Especially, the distortion phenomenon on the images captured with the fish-eye lens is more serious.

The distortion phenomenon on the images captured with the wide-angle lens or the fish-eye lens can be generally classified in two situations—barrel distortion and pincushion distortion. Although these situations can be calibrated by the corresponding calibration functions, it needs a more complex calibration function to calibrate a certain block in the image to accomplish the work of calibrating coordinate points, so as to map the image pixel to the point coordinate of the screen correctly. As a result, it not only requires a large amount of calculation resources, but also wastes time and is inconvenient.

Accordingly, the scope of the invention is to provide an image processing apparatus and an image processing method for generating coordination calibration points to solve the above-mentioned problems.

SUMMARY OF THE INVENTION

A scope of the invention is to provide an image processing apparatus and an image processing method for generating coordination calibration points. The image processing apparatus and the image processing method utilize the edge detection technique and intersection point determining method to generate coordination calibration points rapidly, so as to accelerate the coordination calibration procedure.

The image processing apparatus according to an embodiment of the invention is used to generate a plurality of coordination calibration points according to a first image, a second image, and a third image. The image processing apparatus includes a subtracting module, an edge detection module, and an intersection point generation module. The subtracting module is used for subtracting the first image form the second image to generate a first subtracted image and subtracting the first image from the third image to generate a second subtracted image. The edge detection module is coupled to the subtracting module. The edge detection module is used for performing an edge detection process for the first subtracted image to generate a first edge image and performing the edge detection process for the second subtracted image to generate a second edge image, wherein the first edge image includes a first edge and the second edge image includes a second edge. The intersection point generation module is coupled to the edge detection module. The intersection point generation module is used for generating an intersection point pixel according to the first edge and the second edge. The intersection point pixel serves as a coordination calibration point corresponding to the first edge and the second edge.

The image processing method according to an embodiment of the invention is used for generating a plurality of coordination calibration points according to a first image, a second image, a third image.

In the embodiment of the invention, the image processing method firstly includes the step of subtracting the image from the second image to generate a first subtracted image. Next, the image processing method includes the step of subtracting the first image from the third image to generate a second subtracted image. Then, the image processing method includes the step of performing an edge detection processing for the first subtracted image to generate a first edge image. The first edge image includes a first edge. After that, the image processing method includes the step of performing the edge detection processing for the second subtracted image to generate a second edge image. The second edge image includes a second edge. Finally, the image processing method includes the step of generating an intersection point pixel which serves as a coordination calibration point corresponding to the first edge and the second edge.

The image processing apparatus and the image processing method for generating coordination calibration points according to the invention utilize the edge detection technique and intersection point determining method to generate coordination calibration points rapidly, so as to accelerate the coordination calibration procedure.

The advantage and spirit of the invention may be understood by the following recitations together with the appended drawings.

DETAILED DESCRIPTION OF THE INVENTION

The scope of the invention is to provide an image processing apparatus and an image processing method for generating coordination calibration points. With the embodiment of the invention below, the features and spirits of the invention will be hopefully well described.

Figure 1:
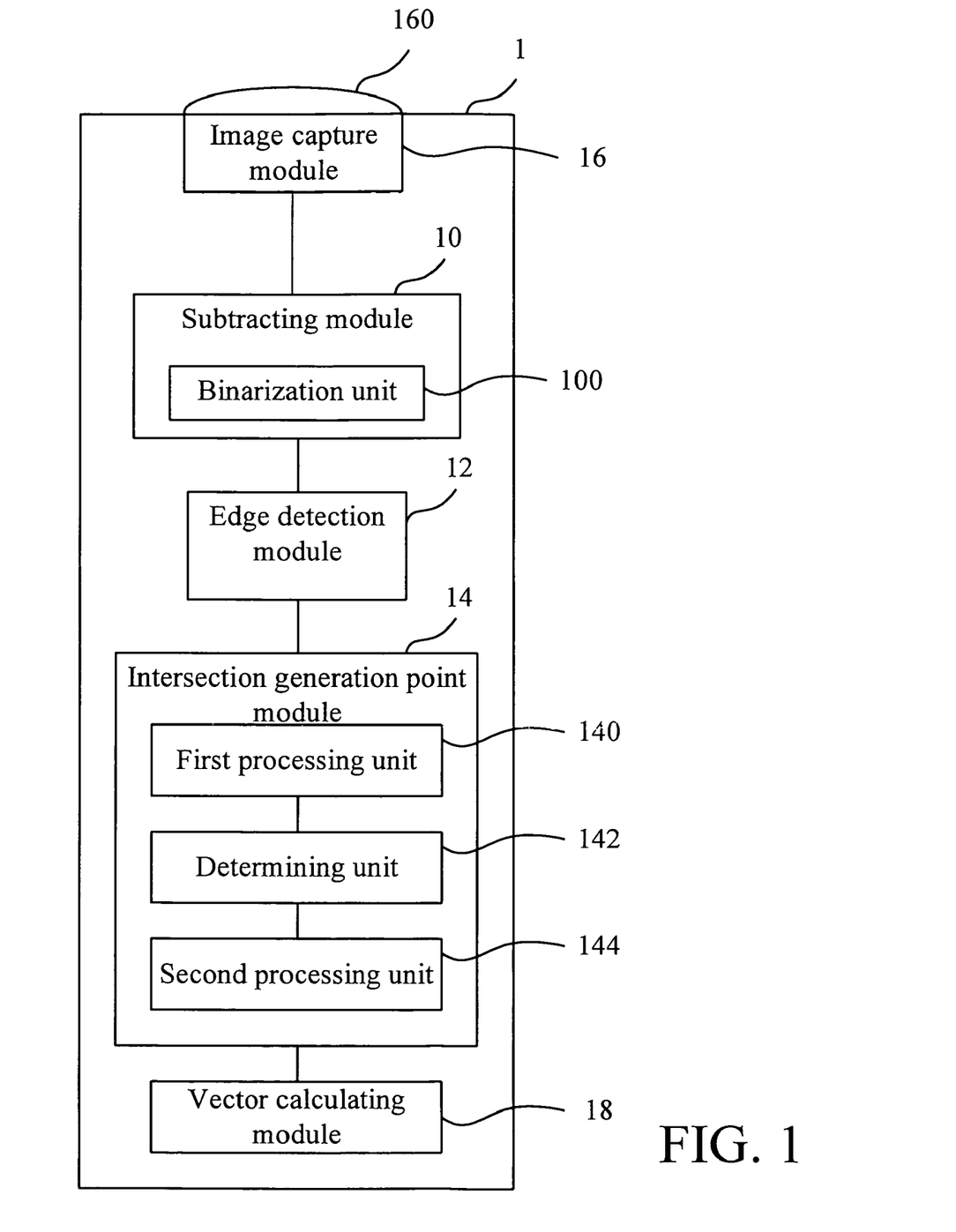
FIG. 1 is a schematic diagram illustrating an image processing apparatus according to an embodiment of the invention.

Please refer to FIG. 1. FIG. 1 is a schematic diagram illustrating an image processing apparatus 1 according to an embodiment of the invention. In the embodiment, the image processing apparatus 1 can be used to generate a plurality of coordination calibration points according to a first image, a second image, and a third image. In a practical application, the coordination calibration points generated by the image processing apparatus 1 can be used for assisting to perform the follow-up coordination calibration procedures. As shown in FIG. 1, the image processing apparatus 1 can include a subtracting module 10, an edge detection module 12, and an intersection point generation module 14.

Figure 2A:
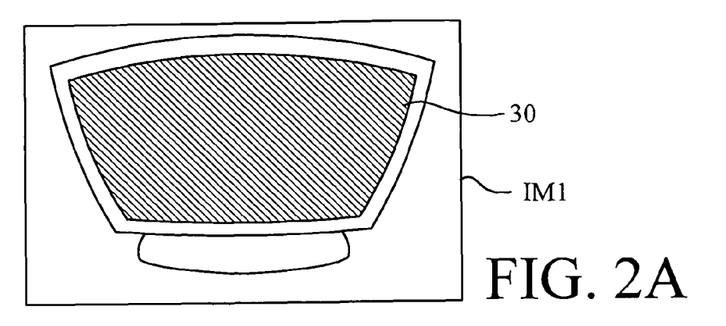
FIG. 2A is a schematic diagram illustrating the first image.
Figure 2B:
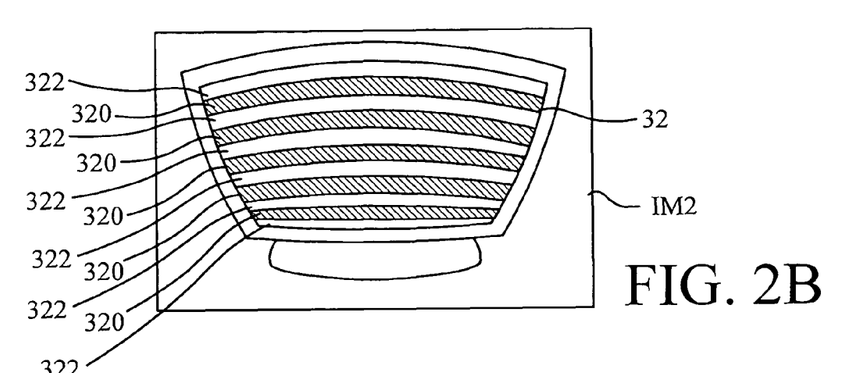
FIG. 2B is a schematic diagram illustrating the second image.
Figure 2C:
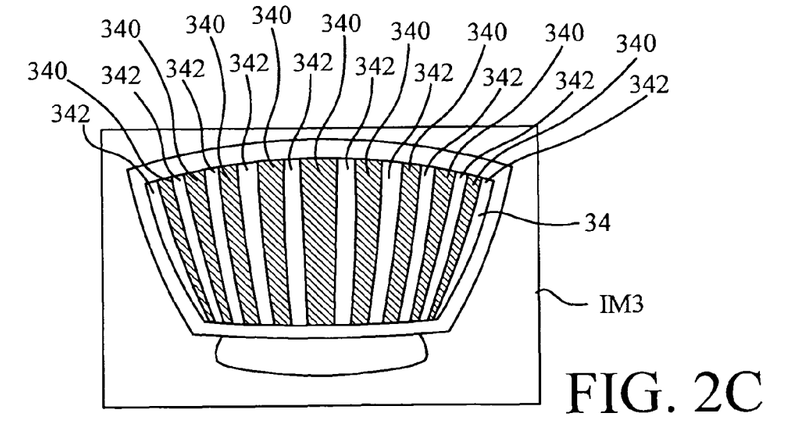
FIG. 2C is a schematic diagram illustrating the third image.

Please refer from FIG. 2A to FIG. 2C. FIG. 2A is a schematic diagram illustrating the first image IM1. FIG. 2B is a schematic diagram illustrating the second image IM2. FIG. 2C is a schematic diagram illustrating the third image IM3. In a practical application, the image processing apparatus 1 can further include an image capture module 16, and the image capture module 16 can include a wide-angle lens 160 or a fish-eye lens. The first image IM1, the second image IM2, and the third image IM3 all can be captured by the image capture module 16. The wide-angle lens 160 has the characteristic of having a wide angle of view, so it is possible to capture large-scale images within a short distance, such as the first image IM1, the second image IM2, and the third image IM3 shown in FIG. 2A to FIG. 2C. However, the disadvantage of the wide-angle lens 160 is that the captured images are seriously distorted, so that the captured images need to be performed special calibration procedures to be used.

Figure 3A:
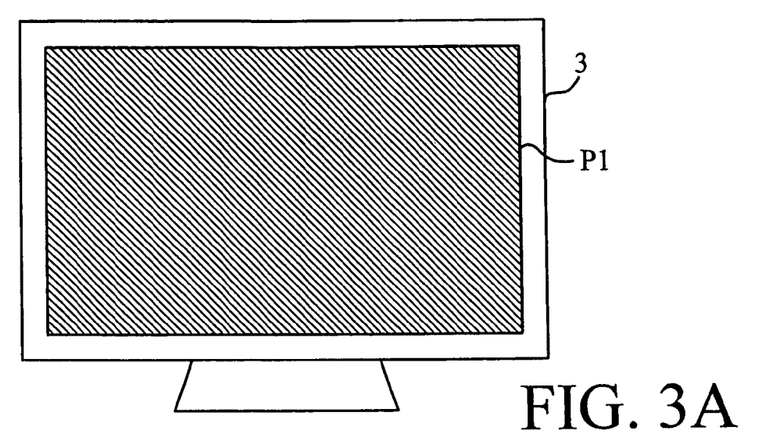
FIG. 3A is a schematic diagram illustrating that the screen displays a first pattern.
Figure 3B:
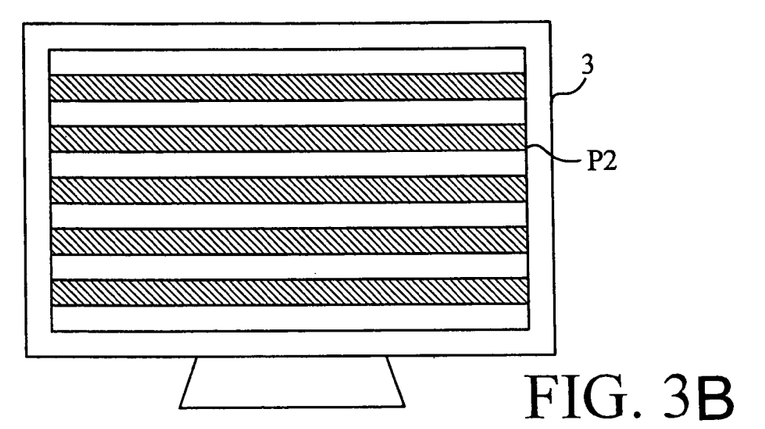
FIG. 3B is a schematic diagram illustrating that the screen displays a second pattern.
Figure 3C:
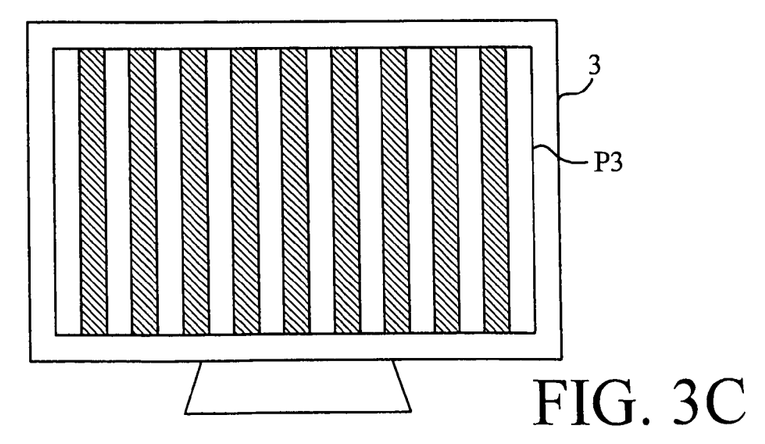
FIG. 3C is a schematic diagram illustrating that the screen displays a third pattern.

Please refer from FIG. 3A to FIG. 3C. FIG. 3A is a schematic diagram illustrating that the screen 3 displays a first pattern P1. FIG. 3B is a schematic diagram illustrating that the screen 3 displays a second pattern P2. FIG. 3C is a schematic diagram illustrating that the screen 3 displays a third pattern P3. In a practical application, the first pattern P1 can be a self-color pattern, such as the full black pattern shown in FIG. 3A. The second pattern P2 can be the horizontal pattern cross-arranged with two-colored strips, such as the pattern cross-arranged with the horizontal black and white strips shown in FIG. 3B. The third pattern P3 can be the vertical pattern cross-arranged with two-colored strips, such as the pattern cross-arranged with the vertical black and white strips shown in the FIG. 3C.

In an embodiment, the first image IM1 can include a self-color region 30 which corresponds to the screen 3, as shown in FIG. 2A. In a practical application, the image capture module 16 can capture the first image IM1 when the screen 3 displays the first pattern P1. As a result, the first image IM1 captured by the image capture module 16 can include the black self-color region 30 which corresponds to the screen 3.

In an embodiment, the second image IM2 can include a first strip image 32 which corresponds to the screen 3, wherein the first strip image 32 includes a plurality of first strips 320 and a plurality of second strips 322 which are cross-arranged, as shown in FIG. 2B. In a practical application, the image capture module 16 can capture the second image IM2 when the screen 3 displays the second pattern P2. As a result, the second image IM2 captured by the image capture module 16 can include the first strip image 32 which corresponds to the screen 3, wherein the first strip 320 of the first strip image 32 is black, and the second strip 322 of the first strip image 32 is white.

Similarly, the third image IM3 can include a second strip image 34 which corresponds to the screen 3, wherein the second strip image 34 includes a plurality of third strips image 340 and a plurality of forth strips 342 image which are cross-arranged, as shown in FIG. 2C. In a practical application, the image capture module 16 can capture the third image IM3 when the screen 3 displays the third pattern P3. As a result, the third image IM3 captured by the image capture module 16 can include the second strip image 34 which corresponds to the screen 3, wherein the third strip 340 of the second strip image 34 is black, and the forth strip 342 of the second strip image 34 is white.

In an embodiment, the first strip 320 and the second strip 322 can be horizontally arranged, and the third strip 340 and the forth 342 can be vertically arranged, as shown in FIG. 2B and FIG. 2C.

Figure 4A:
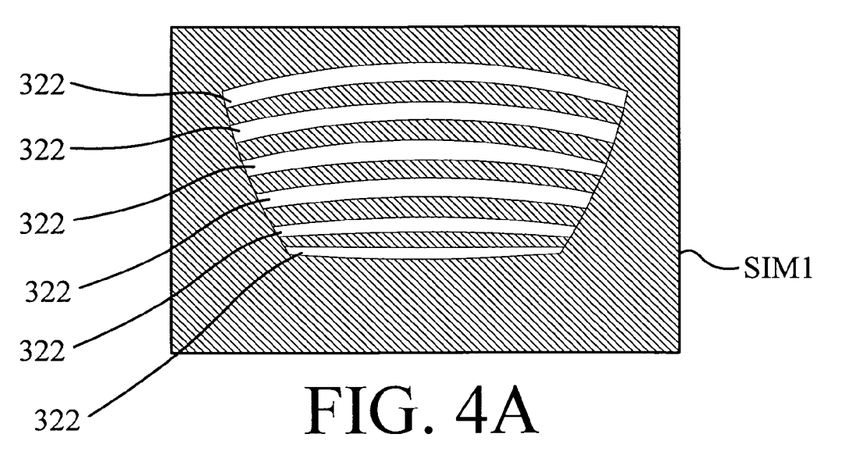
FIG. 4A is a schematic diagram illustrating a first subtracted image.
Figure 4B:
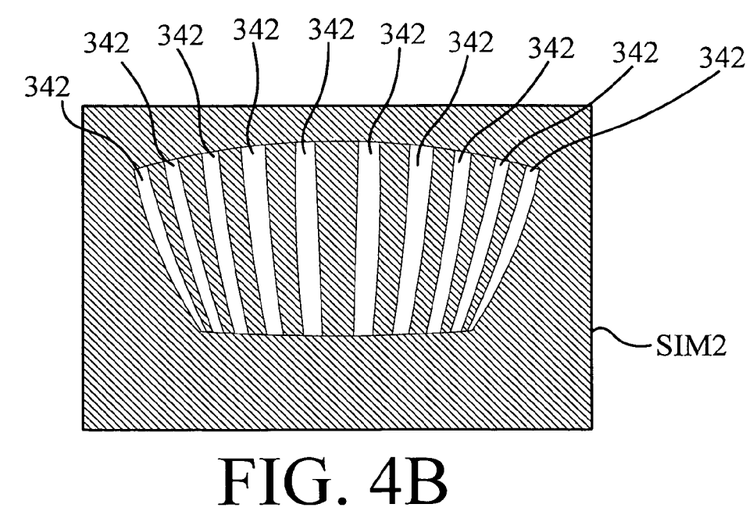
FIG. 4B is a schematic diagram illustrating a second subtracted image.

Please refer to FIG. 4A and FIG. 4B. FIG. 4A is a schematic diagram illustrating a first subtracted image SIM1. FIG. 4B is a schematic diagram illustrating a second subtracted image SIM2. As shown in FIG. 4A, the subtracting module 10 can be used for subtracting the first image IM1 from the second image IM2 to generate the first subtracted image SIM1. It is notable that the self-color region 30 of the first image IM1 has a first color (black), and the plurality of first strips 320 of the first strip image 32 in the second image IM2 also have the first color (black). Therefore, the difference between the second image IM2 and the first image IM1 is the plurality of second strips 322. Accordingly, the first subtracted image SIM1 generated by subtracting the first image IM1 from the second image IM2 only includes the plurality of second strips 322, as shown in FIG. 4A.

Similarly, the subtracting module 10 can be used for subtracting the first image IM1 from the third image IM3 to generate the first subtracted image SIM2, as shown in FIG. 4B. It is notable that the self-color region 30 of the first image IM1 has the first color (black), and the plurality of the third strips 340 of the second strip image 34 in the third image IM3 also have the first color (black). Therefore, the difference between the third image IM3 and the first image IM1 is the plurality of forth strips 342. Accordingly, the second subtracted image SIM2 generated by subtracting the first image IM1 from the third image IM3 only includes the plurality of the forth strips 342, as shown in FIG. 4B.

In a practical application, the subtracting module 10 can further include a binarization unit 100 for binarizing the first subtracted image SIM1 and the second subtracted image SIM2. Thus, the follow-up work of the edge detection module 12 can be easier.

Figure 5A:
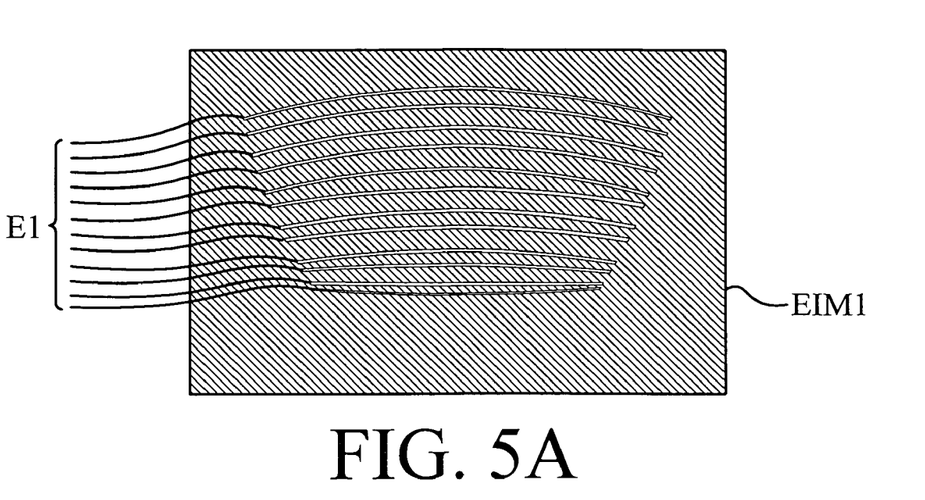
FIG. 5A is a schematic diagram illustrating a first edge image.
Figure 5B:
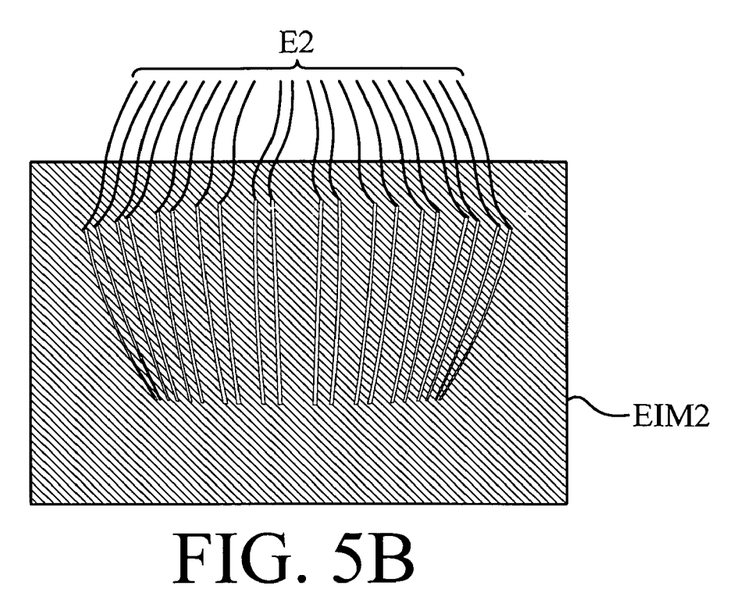
FIG. 5B is a schematic diagram illustrating a second subtracted image.

Please refer to FIG. 5A and FIG. 5B. FIG. 5A is a schematic diagram illustrating a first edge image EIM1. FIG. 5B is a schematic diagram illustrating a second edge image EIM2. The edge detection module 12 is coupled to the subtracting module 10. The edge detection module 12 is used for performing an edge detection process for the first subtracted image SIM1 to generate the first edge image EIM4. As shown in FIG. 5A, the first edge image EIM1 includes a plurality of first edges E1. Similarly, the edge detection module 12 can also perform the edge detection process for the second subtracted image SIM2 to generate the second edge image EIM2. As shown in FIG. 5B, the second edge image EIM2 includes a plurality of second edges E2. In a practical application, each of the widths of the plurality of first edges E1 and the plurality of second edges E2 is one pixel.

In an embodiment, the intersection point generation module 14 is coupled to the edge detection module 12. The intersection point generation module 14 is used for generating an intersection point pixel IP according to each one (a first edge E1, for example) of the plurality of first edges E1 and each one (a second edge E2, for example) of the plurality of second edges E2. The intersection point pixel IP serves as a coordination calibration point corresponding to the first edge E1 and the second edge E2.

In an embodiment, the intersection point generation module 14 can further include a first processing unit 140, a determining unit 142, and a second processing unit 144, as shown in FIG. 1. In order to illustrate an embodiment of generating an intersection point pixel, a first edge E1 of the plurality of the first edges E1 and a second edge E2 of the plurality of the second edges E2 will be taken as an example.

Figure 6:
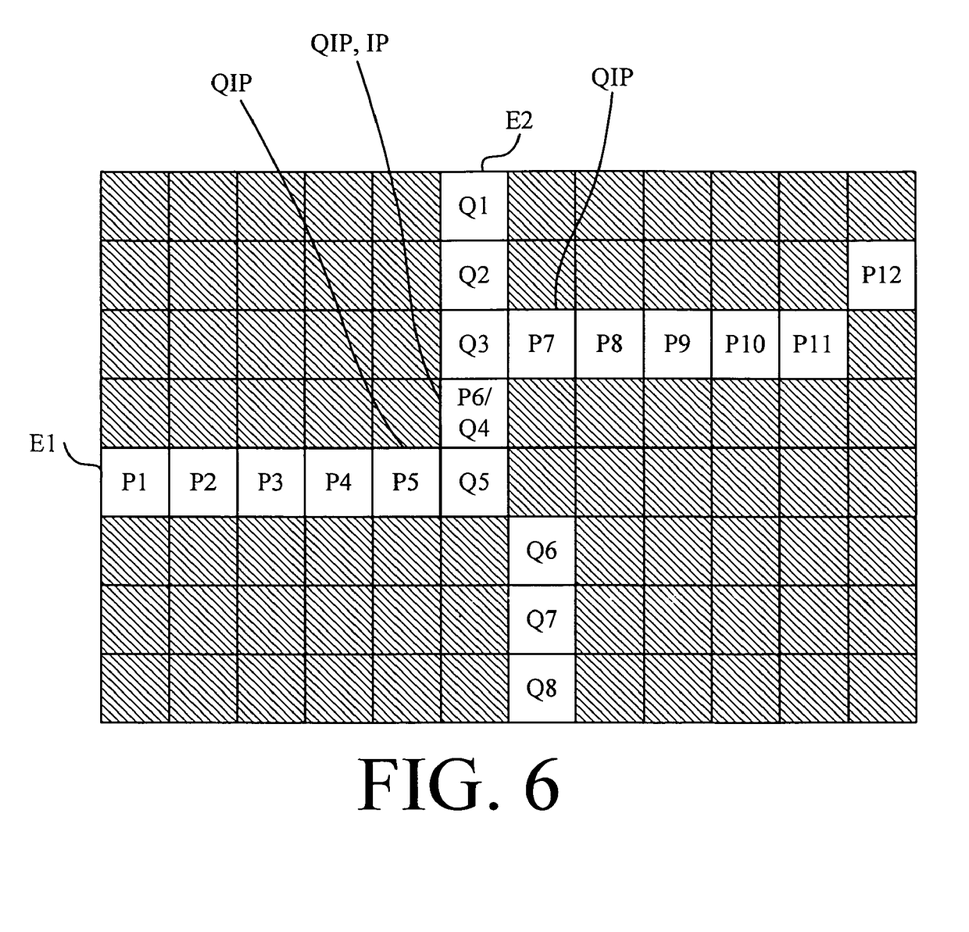
FIG. 6 is a schematic diagram illustrating that the intersection point generation module generates an intersection point pixel.

Please refer to the FIG. 6. FIG. 6 is a schematic diagram illustrating that the intersection point generation module 14 generates an intersection point pixel IP. According to the embodiment, the first edge E1 includes a plurality of first edge pixels P1-P12, and the second edge E2 includes a plurality of second edge pixels Q1-Q8. The first processing unit 140 can calculate a neighboring pixel number corresponding to each of the plurality of the first edge pixels P1-P12 according to the plurality of the first edge pixels P1-P12 and the plurality of second edge pixels Q1-Q8.

The so-called neighboring pixel number can be the number of the eight pixels near a first edge pixel of the plurality of first edge pixels P1-P12. For example, since the neighboring pixels of the first edge pixel P3 are the first edge pixel P2 and the first edge pixel P4, the neighboring pixel number which corresponds to the first edge pixel P3 is 2. Moreover, the neighboring pixels of the first edge pixel P5 are the first edge pixel P4, the second edge pixel Q5, and the first edge pixel P6 (or the second edge pixel Q4). Thus, the neighboring pixel number which corresponds to the first edge pixel P5 is 3.

As shown in FIG. 6, the neighboring pixel number which corresponds to the first edge pixels P2-P4 and the first edge pixels P8-P11 is 2, the neighboring pixel number which corresponds to the first edge pixel P5 is 3, and the neighboring pixel number which corresponds to the first edge pixel P6 and the first edge pixel P7 is 4. It is notable that because the first edge pixels (P1, P2) of two ends have lower possibility to generate intersection point pixels IP, the foregoing neighboring pixel number can be calculated without considering the neighboring pixel numbers of the first edge pixels (P1, P2) of two ends.

The determining unit 142 is coupled to the first processing unit 140. The determining unit 142 is used for determining whether the first edge pixel is an accurate intersection point pixel QIP according to the neighboring pixel number corresponding to the first edge pixel. In a practical application, if the neighboring pixel number which corresponds to the first edge pixel is over a default value, the first edge pixel will be determined as an accurate intersection point pixel. In an embodiment, the default value is more than or equal to 3, so that the determining unit 142 can determine that the first edge pixel is an accurate intersection point pixel. According to the criterion, all of the first edge pixel P5, the first edge pixel P6, and the first edge pixel P7 are accurate intersection point pixels QIP, as shown in FIG. 6.

The second processing unit 144 is coupled to the determining unit 142. The second processing unit 144 is used for generating the intersection point pixel IP according to the plurality of the accurate intersection point pixels QIP. In a practical application, the second processing unit 144 can perform an average calculating procedure to the coordinates of the accurate intersection point pixels QIP to generate the intersection point pixel IP. The intersection point pixel IP serves as a coordination calibration point which corresponds to the first edge E1 and the second edge E2. As shown in FIG. 6, because the first edge pixel P5-P7 are accurate intersection point pixels QIP, the intersection point pixel IP can be generated after processed by the second processing unit 144. The intersection pixel IP serves as the coordination calibration pixel corresponding to the first edge E1 and the second edge E2 in FIG. 6.

Figure 7:
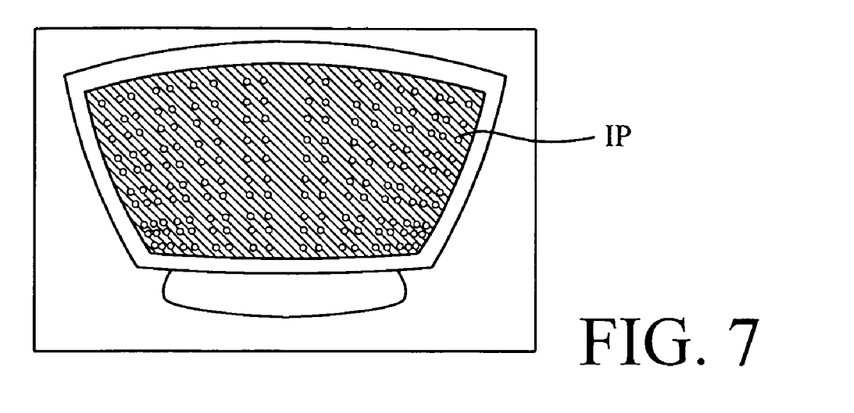
FIG. 7 is a schematic diagram illustrating the plurality of intersection point pixels generated by the intersection point generation module.

Please refer to FIG. 7. FIG. 7 is a schematic diagram illustrating the plurality of intersection point pixels IP generated by the intersection point generation module 14. As shown in FIG. 7, the intersection point generation module 14 can generate the corresponding intersection point pixels IP according to all of the first edges E1 and the second edges E2, such as the plurality of white dots in FIG. 7.

Figure 8:
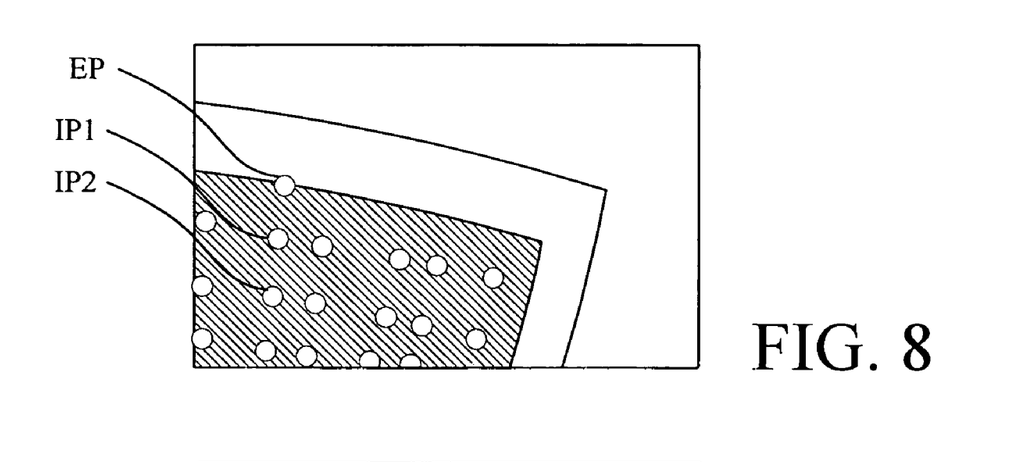
FIG. 8 is a schematic diagram illustrating that the vector calculating module generates an extension point pixel.

Please refer to FIG. 8. FIG. 8 is a schematic diagram illustrating that the vector calculating module 18 generates an extension point EP. Because the deviation between the pixels of two ends of the first edge E1 and the second edge E2 may be larger, the intersection point generation module 14 may not be used to generate the corresponding intersection point pixels. Thus, the image processing module 1 can further include the vector calculating module 18 according to the embodiment, where the vector calculating module 18 is coupled to the intersection point generation module 14. The vector calculating module 18 can be used for generating, based on a vector algorithm, an extension point according to the generated intersection point. As shown in FIG. 8, the vector calculating module 18 can generate, based on the vector algorithm, an extension point EP according to the intersection point pixel IP1 and the intersection point pixel IP2.

Figure 9:
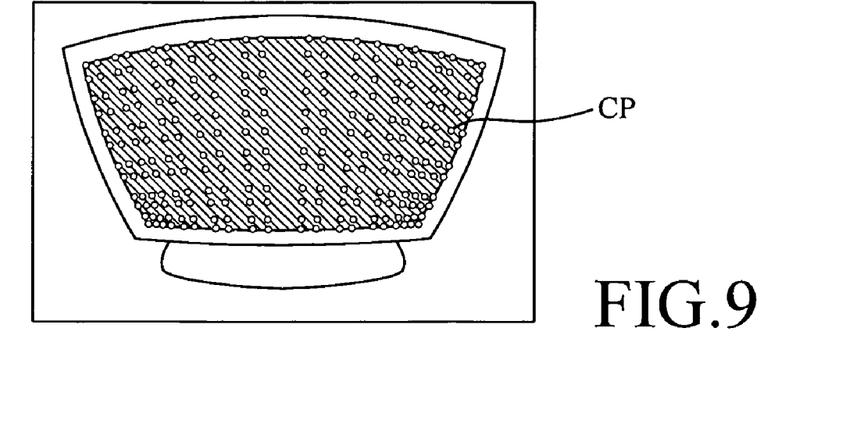
FIG. 9 is a schematic diagram illustrating a plurality of coordination calibration points generated by the image processing apparatus.

Please refer to FIG. 9. FIG. 9 is a schematic diagram illustrating a plurality of coordination calibration points CP generated by the image processing apparatus 1. As shown in FIG. 9, the plurality of extension points EP generated by the vector calculating module 18, and the plurality of intersection points IP generated by the intersection generation point module 14 are the coordination calibration points CP, such as the plurality of white dots shown in FIG. 9. The plurality of coordination calibration points CP can be used for assisting in performing the follow-up coordination calibration procedures.

Figure 10:
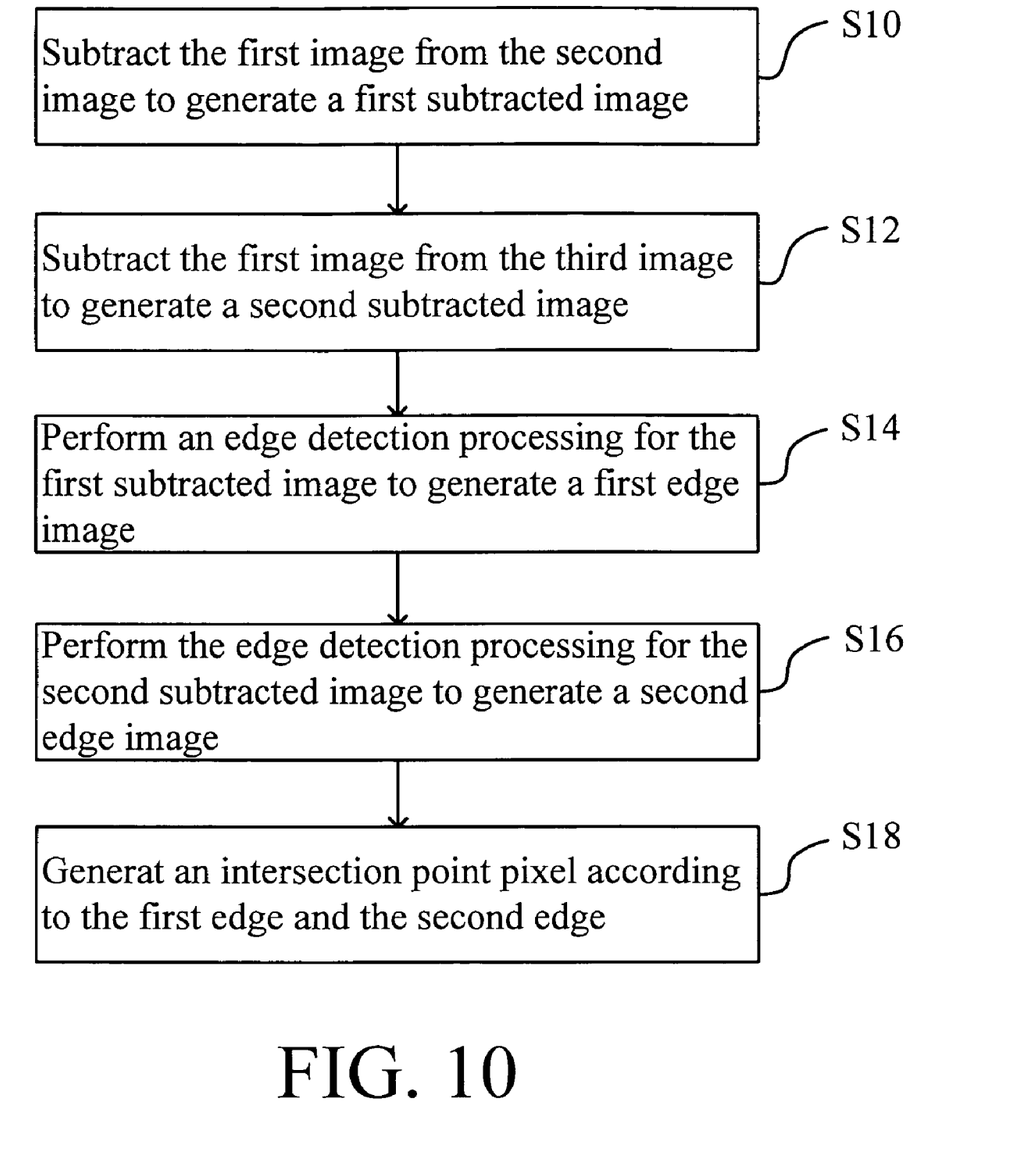
FIG. 10 is a flow chart showing the image processing method according to another embodiment of the invention.

Please refer to FIG. 10 along with FIG. 1 to FIG. 9. FIG. 10 is a flow chart showing the image processing according to another embodiment of the invention. In the embodiment, the image processing method can be performed to generate the plurality of coordination calibration points CP according to the first image IM1, the second image IM2, and the third image IM3. In a practical application, the image processing method can be used, but not limited to, in the image processing apparatus 1 shown in FIG. 1. The contents and examples related to the image processing apparatus 1, the first image IM1, the second image IM2, and the third image IM3 have been described previously, so they will not be described in detail again here.

As shown in FIG. 10, the image processing method firstly includes step S10: subtracting the first image IM1 from the second image IM2 to generate a first subtracted image SIM1. Next, the image processing method includes step S12: subtracting the first image IM1 from the third image IM3 to generate a second subtracted image SIM2. Then, the image processing method includes step S14: performing an edge detection processing for the first subtracted image SIM1 to generate a first edge image EIM1, wherein the first edge image EIM1 includes a first edge E1. After that, the image processing method includes step S16: performing the edge detection processing for the second subtracted image SIM2 to generate a second edge image EIM2, wherein the second edge image EIM2 includes a second edge E2. Finally, the image processing method includes step S18: generating an intersection point pixel IP according to the first edge E1 and the second edge E2. And, the intersection point pixel IP serves as a coordination calibration point CP corresponding to the first edge E1 and the second edge E2.

In a practical application, step S10 can further include the step of binarizing the first subtracted image SIM1, and step S12 can further include the step of binarizing the second subtracted image SIM2. Thereby, the follow-up edge detection processes can be easier.

Figure 11:
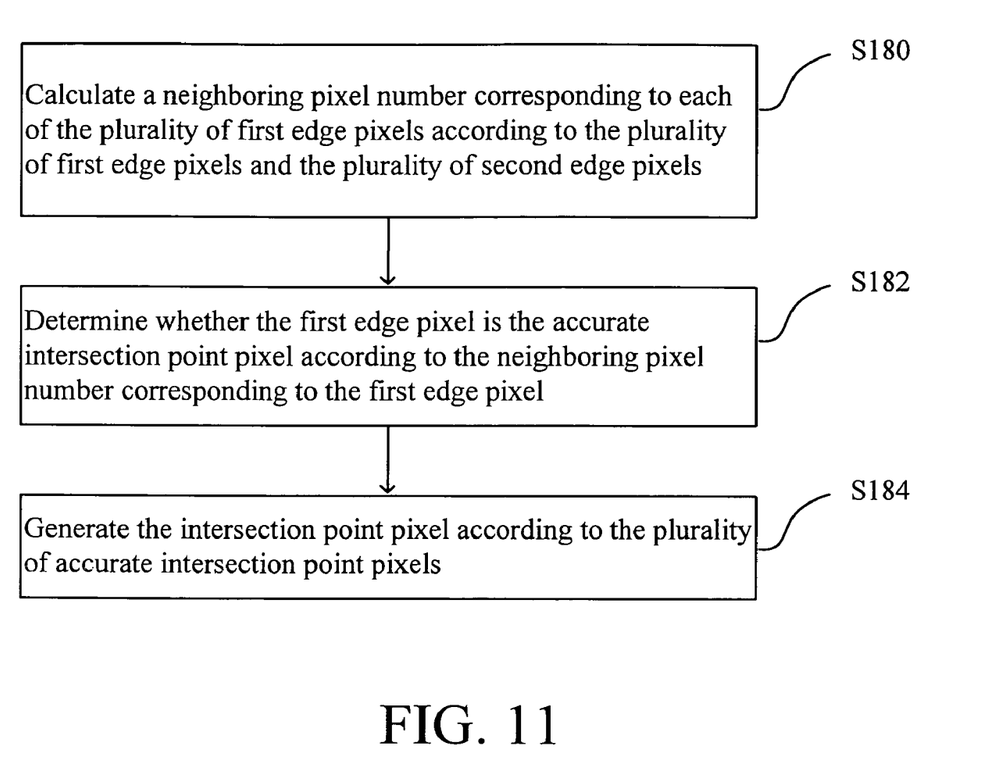
FIG. 11 is a detail flow chart showing the step S18 in FIG. 10.

Please refer to FIG. 11 along with FIG. 1 to FIG. 6. FIG. 11 is a detail flow chart showing the step S18 in FIG. 10. In an embodiment, the first edge E1 can include a plurality of first edge pixels P1-P12, and the second edge E2 can include a plurality of second edge pixels Q1-Q8. In a practical application, step S18 can further include the following steps. As shown in FIG. 11, the image processing method firstly includes step S180: calculating a neighboring pixel number corresponding to each of the plurality of first edge pixels P1-P12 according to the plurality of first edge pixels P1-P12 and the plurality of second edge pixels Q1-Q8. Next, the image processing method includes step S182: determining whether the first edge pixel is the accurate intersection point pixel QIP according to the neighboring pixel number corresponding to the first edge pixel. Finally, the image processing method includes step S184: generating the intersection point pixel IP according to the plurality of accurate intersection point pixels QIP. The detail contents and examples of step S180-S184 have been described previously, so they will not be described in detail again here.

The coordination calibration point CP generated by the image processing method can be used for assisting in performing the follow-up coordination calibration procedures.

The image processing apparatus and the image processing method for generating coordination calibration points according to the invention utilize the edge detection technique and intersection point determining method to generate coordination calibration points rapidly, so as to provide the coordination calibration procedure efficiency of the prior art. In addition, the embodiments of the invention can perform coordination calibration for the distorted images. Therefore, a well coordination calibration performance can be achieved to perform the coordination calibration procedure accompanied with the image processing apparatus, even though images are distorted due to the poor quality of the lens or the use of a wide-angle lens or a fish-eye lens.

With the example and explanations above, the features and spirits of the invention will be hopefully well described.

Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. An image processing method, for generating coordination calibration points, the image processing method generating a plurality of coordination calibration points according to a first image, a second image, and a third image, the image processing method comprising the steps of:
   subtracting the first image from the second image to generate a first subtracted image;
   subtracting the first image from the third image to generate a second subtracted image;
   performing an edge detection processing for the first subtracted image to generate a first edge image, wherein the first edge image comprises a first edge, wherein the first edge comprises a plurality of first edge pixels;
   performing the edge detection processing for the second subtracted image to generate a second edge image, wherein the second edge image comprises a second edge, wherein the second edge comprises a plurality of second edge pixels;
   generating an intersection point pixel according to the first edge and the second edge, the intersection point pixel serving as a coordination calibration point corresponding to the first edge and the second edge;
   calculating a neighboring pixel number corresponding to each of the plurality of first edge pixels according to the plurality of first edge pixels and the plurality of second edge pixels;
   determining whether the first edge pixel is the accurate intersection point pixel according to the neighboring pixel number corresponding to the first edge pixel; and
   generating the intersection point pixel according to the plurality of accurate intersection point pixels.

2. The image processing method of claim 1, wherein the first image comprises a self-color region corresponds to a screen.

3. The image processing method of claim 2, wherein the second image comprises a first strip image which corresponds to the screen, and the third image comprises a second strip image which corresponds to the screen, wherein the first strip image comprises a plurality of first strips and a plurality second strips which are cross-arranged, and the second strip image comprises a plurality of third strips and a plurality of forth strips which are cross-arranged.

4. The image processing method of claim 3, wherein the plurality of first strips and the plurality of second strips are horizontally arranged, and the plurality of third strips and the plurality of forth are vertically arranged.

5. The image processing method of claim 3, wherein the self-color region has a first color, and each of the plurality of first strips is a self-colored strips which has the first color.

6. The image processing method of claim 3, wherein the self-color region has a first color, and each of the plurality of third strips is a self-color strip which has the first color.

7. The image processing method of claim 1, wherein the step of generating the first subtracted image further comprises the step of binarizing the first subtracted image.

8. The image processing method of claim 1, wherein the first image, the second image, and the third image are all captured by an image capture module which comprises a wide-angle lens.

9. An image processing method, for generating coordination calibration points, the image processing method generating a plurality of coordination calibration points according to a first image, a second image, and a third image, the image processing method comprising the steps of:

subtracting the first image from the second image to generate a first subtracted image;

subtracting the first image from the third image to generate a second subtracted image;

performing an edge detection processing for the first subtracted image to generate a first edge image, wherein the first edge image comprises a first edge;

performing the edge detection processing for the second subtracted image to generate a second edge image, wherein the second edge image comprises a second edge; and generating an intersection point pixel according to the first edge and the second edge, the intersection point pixel serving as a coordination calibration point corresponding to the first edge and the second edge, wherein the step of generating the second subtracted image further comprises the step of binarizing the second subtracted image.

* * * * *